Patented July 14, 1936

2,047,664

UNITED STATES PATENT OFFICE 2,047,664

NAPHTHENYL ESTERS OF POLYCARBOXYLIC ACIDS AND THEIR PRODUCTION

Harold J. Barrett, Wilmington, and Wilbur A. Lazier, New Castle County, Del., assignors to E. I. du Pont de Nemours & Company, Wilmington, Del., a corporation of Delaware No Drawing. Application May 10, 1935, Serial No. 20,768

17 Claims. (Cl. 260—1)

This invention relates to new compositions of matter, more particularly to naphthenyl esters of polybasic and particularly polycarboxylic acids, and also to the use of such esters in cellulose derivative and other plastic compositions.

This application is a continuation in part of our copending application Serial No. 669,202, filed May 3, 1933.

This invention has as an object the preparation of naphthenyl esters of polybasic and preferably polycarboxylic acids. A further object is the new class of esters thus produced. A still further object is the preparation of useful plastic compositions. Other objects will appear hereinafter.

These objects are accomplished by the following invention wherein a polybasic carboxylic acid, and preferably a polycarboxylic acid, its anhydride, chloride, or simple ester with a volatile alcohol is reacted with a naphthenyl alcohol or a mixture of naphthenyl alcohols, or wherein a sodium salt of the acid is reacted with the chloride or other halide of the naphthenyl alcohol under suitable conditions, or wherein an acid naphthenyl ester of the polycarboxylic acid is further reacted with another alcohol.

The polybasic carboxylic and preferably polycarboxylic acid esters of naphthenyl alcohols may be prepared by reacting the acid, its anhydride, chloride, or simple ester with a volatile alcohol with naphthenyl alcohols as exemplified in the following examples:

Example 1.—Dinaphthenyl carbonate

One hundred and seventeen grams of a toluene solution containing 25% by weight of phosgene in a suitable vessel fitted with a reflux condenser was cooled in an ice bath and 100 g. naphthenyl alcohols (B. P. 101°–141° C./19 mm.) having an average molecular weight of 169 as calculated from analytical determinations of hydroxyl number, was added slowly. The solution was allowed to stand over night at room temperature. The toluene was removed by distillation and the product distilled under reduced pressure. The dinaphthenyl carbonate (B. P. 179°–205° C./4 mm.) was a colorless liquid soluble in all common organic solvents.

Example 2.—A naphthenyl acid phthalate

Forty-two and two-tenths grams of naphthenyl alcohols (B. P. 101°–141° C./19 mm.) having an average molecular weight of 169 as calculated from analytical determinations of hydroxyl number was mixed with 37 parts of phthalic anhydride in a suitable vessel. The mixture was heated in an oil bath at 120° C. for 3.5 hours. Determinations of the acid number indicated the product to be naphthenyl acid phthalate. The product was a colorless, viscous liquid, soluble in aromatic hydrocarbons and other organic solvents.

Example 3.—A naphthenyl acid phthalate

One hundred parts by weight of naphthenyl alcohols (B. P. 130°–168° C./1 mm.) obtained by sodium reduction of the ethyl ester of naphthenic acid with an average molecular weight of 274 as calculated from an analytical determination of hydroxyl number, was mixed with 100 parts by weight of phthalic anhydride and the mixture heated at 120° C. in a suitable vessel for 2 hours. Determination of the acid number indicated the product to be naphthenyl acid phthalate. The product was a light yellow colored, very viscous liquid, soluble in aromatic hydrocarbons and other organic solvents.

Example 4.—A dinaphthenyl phthalate

Six hundred twenty-five parts by weight of naphthenyl alcohol (B. P. 101°–141° C./19 mm.) with an indicated molecular weight of 169 as calculated from analytical determinations by hydroxyl numbers, was mixed with 300 parts of toluene and 350 parts of dimethyl phthalate. Ten parts by weight of litharge was added and the mixture heated to boiling in a distillation apparatus. The initial boiling point was 63°–65° C. and gradually rose to 110° C. where 200 cc. of distillate had been collected. The temperature of the reaction mixture was 145°–150° C. The product was then treated with decolorizing carbon, filtered, steam distilled in vacuo, and again decolorized with carbon and filtered. The yield was 720 g. of a colorless mobile oil, soluble in all organic solvents.

Example 5.—Dinaphthenyl hexahydrophthalate

Two molar portions of naphthenyl alcohols and one molar portion of the dimethyl ester of hexahydrophthalic acid were added to 300 g. of toluene and 10 g. of litharge. The reaction mixture was heated until the temperature of distillation reached the boiling point of toluene. The reaction product was treated with decolorizing carbon and filtered, steamed in vacuo, treated with decolorizing carbon again and filtered. The product was a white to light yellow mobile oil. The dinaphthenyl hexahydrophthalate was soluble in all organic solvents.

Example 6.—Dinaphthenyl tetrahydronaphthalenedicarboxylate

One mol of tetrahydronaphthalenedicarboxylic acid dimethyl ester and two mols of naphthenyl alcohols were dissolved in 300 g. of toluol and 10 g. of litharge added. The reaction mixture was heated in an apparatus designed for distillation until the temperature of distillation reached the boiling point of toluol. The product was decolorized with carbon, filtered, steamed in vacuo, again decolorized with carbon, and filtered. The dinaphthenyl ester of tetrahydronaphthalenedicarboxylic acid was a colorless to light amber mobile liquid, soluble in all organic solvents.

Example 7.—Dodecyl naphthenyl phthalate

One molecular proportion of dimethyl phthalate and one molecular proportion of dodecyl alcohol were dissolved in 300 g. of toluol and 10 g. of litharge added. The reaction mixture was heated in a distillation apparatus until the boiling point of the distillate reached the boiling point of toluene. One molecular proportion of naphthenyl alcohol and 200 g. of toluol were then added and the reaction mixture again heated until the boiling point of the distillate reached that of toluene. The reaction product was treated with carbon, steamed in vacuo, and filtered. The product was a colorless to light amber mobile oil, soluble in all common organic solvents. The product was essentially dodecyl naphthenyl phthalate containing only a trace of unreacted naphthenyl and dodecyl alcohols.

The esters coming within the scope of the present invention are derived from naphthenyl alcohols which may be obtained by the catalytic carboxyl hydrogenation or the sodium carboxyl reduction of naphthenic acid derivatives obtained from petroleum such as California, Russian, Roumanian, or Texas petroleum. In addition to the esters disclosed in the examples, the invention broadly includes polybasic carboxylic but preferably polycarboxylic acid esters of naphthenyl alcohols broadly, including also naphthenyl ethyl succinate, naphthenyl ethyl sebacate, dinaphthenyl sebacate, naphthenyl octadecen-9, 10,-yl phthalate, naphthenyl tetradecyl succinate, and dinaphthenyl terephthalate.

All the naphthenyl alcohols studied may be esterified according to the methods of the present invention. Naphthenyl alcohols which boil at 100°–143° C./20 mm. have been used. Their molecular weight, based on hydroxyl number, is 169 and they may be obtained by vapor phase hydrogenation of the naphthenic acids from Russian petroleum, or liquid phase hydrogenation of esters thereof. Naphthenyl alcohols boiling at 110°–148° C./18 mm., having a molecular weight, based on hydroxyl number, of 169 and obtainable by sodium reduction or liquid phase hydrogenation of the esters of California petroleum naphthenic acids may also be used. Naphthenyl alcohols boiling at 120°–165° C./1 mm., having a molecular weight, based on hydroxyl number, of 275 and obtainable by sodium reduction of the esters of California petroleum naphthenic acids, or vapor phase hydrogenation of the acids may also be used. Naphthenyl alcohols boiling at 152°–175° C./1 mm., having a molecular weight, based on hydroxyl number, of 315 and obtainable by sodium reduction of the ethyl ester of the naphthenic acids of Texas petroleum may also be used.

The invention is thus broadly applicable to esters of polybasic carboxylic and preferably polycarboxylic acids wherein at least one acid hydrogen is replaced by a naphthenyl alcohol radical. A further acid hydrogen may be unreplaced in which case the resulting compound is an acid naphthenyl ester. Mixed esters wherein a further acid hydrogen is replaced by a different alcohol radical also come within the scope of the invention. This radical may be that of an aliphatic alcohol such as methyl, ethyl, dodecyl, octadecyl, etc., alcohols, or aromatic as for example, benzyl alcohol, phenylethyl alcohol, and the like. The further alcohol radical may be saturated as for example, octyl, or unsaturated as for example, crotonyl or octadecen-9, 10,-yl. The alcohol radical may also be that of an alicyclic alcohol such as cyclohexanol or heterocyclic as for example that of tetrahydrofurfuryl alcohol.

In the preparation of the esters, polycarboxylic acids other than those above mentioned may be used including aliphatic polycarboxylic acids such as oxalic, succinic, adipic, maleic, fumaric, glutaric, etc.; aromatic carboxylic acids other than those above mentioned may be used including trimesic, naphthalic, etc.; substituted acids may be used such as nitrophthalic, diglycollic, tartaric, maleic, citric, and the like. Carbonic acid, a dibasic carboxylic acid, may be used in the form of its chloride or esters with volatile alcohols and phenols to form appropriate carbonates. Esters of oxalic, malonic, and mellitic acids are preferably likewise made by less drastic methods for example from the chloride of a naphthenyl alcohol and an alkali metal salt or by ester interchange of a naphthenyl alcohol with the ester of the acid with a volatile alcohol. Heterocyclic acids such as quinolinic and cinchomeronic acids may be used. Alicyclic acids such as hexahydrophthalic and tetrahydronaphthalenedicarboxylic acid may be employed. The invention is thus broadly applicable to polybasic carboxylic acids and particularly to polycarboxylic acids.

The methods for the preparation of the esters described are capable of considerable variation. Catalysts other than those mentioned may be used; solvents other than those mentioned, for example benzene, xylene, ethers such as di-n-propyl ether, diisopropyl ether, di-n-butyl ether, diisobutyl ether, diamyl ether, etc., may be used for the purpose of removing the water formed in the reaction, and solvents may be employed without the aid of a catalyst.

The esters are broadly applicable in the formulation of cellulose ester and ether compositions. They may be used in the preparation of cellulose nitrate lacquers for coating metals and wood, cellulose nitrate dopes for coating fabrics, moistureproof lacquers for coating regenerated cellulose, and in plastic compositions for use in the preparation of toiletware, novelties, sheeting, rods, tubes, safety glass interlayers, etc. The esters of the present invention are useful as agents to increase the luster of polishing waxes, as assistants in pigment dispersions, in paper sizes, in oil-soluble detergents, and in the preparation of extreme pressure lubricants.

The esters furnish extremely high-boiling and water resistant plasticizers for cellulose derivatives which because of the low vapor pressure of the ester give permanently flexible products of good durability. Thus, when tested as a softener in cellulose nitrate compositions for coating fabrics, dinaphthenyl phthalate was found to be superior to castor oil with respect to exudation and cold crack, and altho inferior to castor oil with respect to wearing quality initially, dinaphthenyl phthalate was found to be superior after the fourth week in accelerated aging tests, and was found more useful than the straight chain alcohol derivatives, such as didodecyl phthalate. The naphthenyl acid phthalates, when used as plasticizers in lacquers for regenerated cellulose films, showed high moistureproofing properties. The naphthenyl acid phthalates were compatible with ethyl cellulose, cellulose acetate, and wax, and were effective in producing increased luster in wax polishing compositions for cellulose nitrate coatings. The naphthenyl acid phthalates when added to lubricating oils maintain an effective lubricating action at very high pressures as shown by the method of testing devised by J. O. Allmen (Oil and Gas Journal, 30 109 (1931)). This method consists in running a pin between two halves of a journal bearing, the load on the journal being controllable and provision being made for measuring the torque developed by the friction of the lubricant film. Two percent of naphthenyl acid phthalate such as that prepared in Example 2 added to a medium viscosity (SAE—30) mineral oil, and the whole warmed slightly until the ester had dissolved imparted to the oil a film resistance of 16 pounds gauge, which is substantially equivalent to that obtained with triaryl phosphates, and superior to that obtained with dodecyl acid phthalate (12 lbs.).

The above description and specific examples are intended for illustration only. Any modification of or variation therefrom which conforms to the spirit of the invention may be included within the scope of the claims.

We claim:

1. An ester of a polybasic carboxylic acid wherein at least one carboxyl hydrogen is replaced by a naphthenyl radical.

2. An ester of a polycarboxylic acid wherein at least one carboxyl hydrogen is replaced by a naphthenyl radical.

3. An ester of a dicarboxylic acid wherein at least one carboxyl hydrogen is replaced by a naphthenyl radical.

4. An ester of a polycarboxylic acid wherein the hydrogen of at least one carboxyl group is replaced by a naphthenyl radical, and the hydrogen of at least one other carboxyl group is replaced by the radical of a different alcohol.

5. An ester of a polycarboxylic acid wherein the carboxyl hydrogens are replaced by a mixture of naphthenyl alcohols as obtainable by the carboxylic reduction of naphthenic acids from petroleum.

6. An ester of a dicarboxylic acid wherein the carboxyl hydrogens are replaced by a mixture of naphthenyl alcohols as obtainable by the carboxylic reduction of naphthenic acids from petroleum.

7. An ester of an aromatic dicarboxylic acid wherein the carboxyl hydrogens are replaced by a mixture of naphthenyl alcohols as obtainable by the carboxylic reduction of naphthenic acids from petroleum.

8. An ester of phthalic acid wherein the carboxylic hydrogens are replaced by a mixture of naphthenyl alcohols as obtainable by the carboxylic reduction of naphthenic acids from petroleum.

9. An ester of an aromatic polycarboxylic acid wherein the hydrogen atom of at least one carboxyl group is replaced by a naphthenyl radical.

10. An ester of an aromatic dicarboxylic acid wherein the hydrogen atom of at least one carboxyl group is replaced by a naphthenyl radical.

11. An ester of phthalic acid wherein the hydrogen atom of at least one carboxyl group is replaced by a naphthenyl radical.

12. A naphthenyl acid phthalate.

13. A neutral ester of a polycarboxylic acid wherein at least one carboxyl group is replaced by a naphthenyl radical.

14. A neutral ester of a polycarboxylic acid wherein the carboxyl hydrogens are replaced by naphthenyl radicals.

15. Naphthenyl phthalate.

16. A process for preparing naphthenyl esters of aliphatic saturated dicarboxylic acids which comprises reacting an aliphatic saturated dicarboxylic acid stable under the conditions of the reaction with a naphthenyl alcohol.

17. The naphthenyl esters of aliphatic saturated dicarboxylic acids.

HAROLD J. BARRETT.
WILBUR A. LAZIER.